US012744133B2

(12) United States Patent
Mizuno et al.

(10) Patent No.: US 12,744,133 B2
(45) Date of Patent: Sep. 22, 2026

(54) WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Housei Mizuno, Osaka (JP); Kyousyou Kou, Osaka (JP); Miyu Aramaki, Osaka (JP); Junichi Shirakawa, Mie (JP); Ryo Aragaki, Mie (JP); Daichi Kagawa, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 205 days.

(21) Appl. No.: 18/711,234

(22) PCT Filed: Nov. 28, 2022

(86) PCT No.: PCT/JP2022/043725

§ 371 (c)(1),
(2) Date: May 17, 2024

(87) PCT Pub. No.: WO2023/100792

PCT Pub. Date: Jun. 8, 2023

(65) Prior Publication Data

US 2025/0006404 A1 Jan. 2, 2025

(30) Foreign Application Priority Data

Nov. 30, 2021 (JP) ................................ 2021-194128

(51) Int. Cl.
*H01B 7/08* (2006.01)

(52) U.S. Cl.
CPC .................................. *H01B 7/0846* (2013.01)

(58) Field of Classification Search
CPC ...... H01B 7/0009; H01B 7/02; H01B 7/0216; H01B 7/08; H01B 11/02; H01B 11/04;
(Continued)

(56) References Cited

U.S. PATENT DOCUMENTS 3,736,366 A * 5/1973 Wittenberg ............ H01B 11/02 439/387
4,012,577 A * 3/1977 Lang .................... H01B 7/0876 174/34

(Continued)

FOREIGN PATENT DOCUMENTS

JP 61-218007 9/1986
JP 61218007 A * 9/1986 ............... H01B 7/08
JP 2020-36523 3/2020

OTHER PUBLICATIONS

Office Action issued in Japan Patent Application No. 2021-194128, dated May 13, 2025, together with English translation thereof.

(Continued)

*Primary Examiner* — William H. Mayo, III
(74) *Attorney, Agent, or Firm* — Greenblum & Bernstein, P.L.C.

(57) ABSTRACT

A wiring member includes a twisted wire in which a first wire-like transmission member and a second wire-like transmission member are stranded and a base member to which (Continued)

the twisted wire is fused and fixed. Each of the first wire-like transmission member and the second wire-like transmission member is fused to the base member in each of the side-by-side parts in which the first wire-like transmission member and the second wire-like transmission member are arranged side by side on the base member in the twisted wire to form a side-by-side fusion part. A length of a first half cycle section including the side-by-side fusion part is larger than a length of a second half cycle section located adjacent to the first half cycle section.

6 Claims, 6 Drawing Sheets

(58) Field of Classification Search
CPC ... H01B 7/0807; H01B 7/0876; H01B 7/0892
USPC ................ 174/32–36, 110 R, 113 R, 113 A, 174/117 R–117 FF, 120 R
See application file for complete search history.

(56) References Cited

U.S. PATENT DOCUMENTS 4,486,619 A * 12/1984 Trine .................... H01B 11/02 174/34
5,276,759 A * 1/1994 Nguyen ............... G02B 6/4403 174/121 R
5,502,287 A * 3/1996 Nguyen ............... H01B 7/0846 174/117 A
6,215,071 B1 * 4/2001 Kasahara ............. H01B 7/0876 174/117 FF
6,635,826 B2 * 10/2003 Yamamoto ........... H01B 7/0876 174/117 F
2021/0358655 A1 * 11/2021 Fukushima .............. H02G 3/30

OTHER PUBLICATIONS

International Search Report issued in International Patent Application No. PCT/2022/043725, dated Feb. 7, 2023, along with an English translation thereof.

* cited by examiner

WIRING MEMBER

TECHNICAL FIELD

The present disclosure relates to a wiring member.

BACKGROUND ART

Patent Document 1 discloses a wiring member in which an assembled wire made up of a plurality of bundled wire-like transmission members is fixed to a base member.

PRIOR ART DOCUMENTS

Patent Document(s)

Patent Document 1: Japanese Patent Application Laid-Open No. 2020-36523

SUMMARY

Problem to be Solved by the Invention

It is desired that a twisted wire is fused and fixed to a base member more rigidly.

Accordingly, an object is to provide a technique capable of fusing and fixing a twisted wire to a base member more rigidly.

Means to Solve the Problem

A wiring member according to the present disclosure includes: a twisted wire in which a first wire-like transmission member and a second wire-like transmission member are stranded; and a base member to which the twisted wire is fused and fixed, wherein when parts of the twisted wire in which the first wire-like transmission member and the second wire-like transmission member are arranged side by side on the base member are side-by side parts, and parts of the twisted wire in which the first wire-like transmission member and the second wire-like transmission member are vertically arranged are vertical parts, the side-by-side parts and the vertical parts alternately extend along an extension direction of the twisted wire, a section between two of the vertical parts continuously formed is a half cycle section of a strand in the twisted wire, each of the first wire-like transmission member and the second wire-like transmission member is fused to the base member in each of the side-by-side parts to form a side-by-side fusion part, and a length of a first half cycle section including the side-by-side fusion part is larger than a length of a second half cycle section located adjacent to the first half cycle section.

Effects of the Invention

According to the present disclosure, the twisted wire can be fused and fixed to the base member more rigidly.

DESCRIPTION OF EMBODIMENT(S)

Description of Embodiment of Present Disclosure

Figure 1:
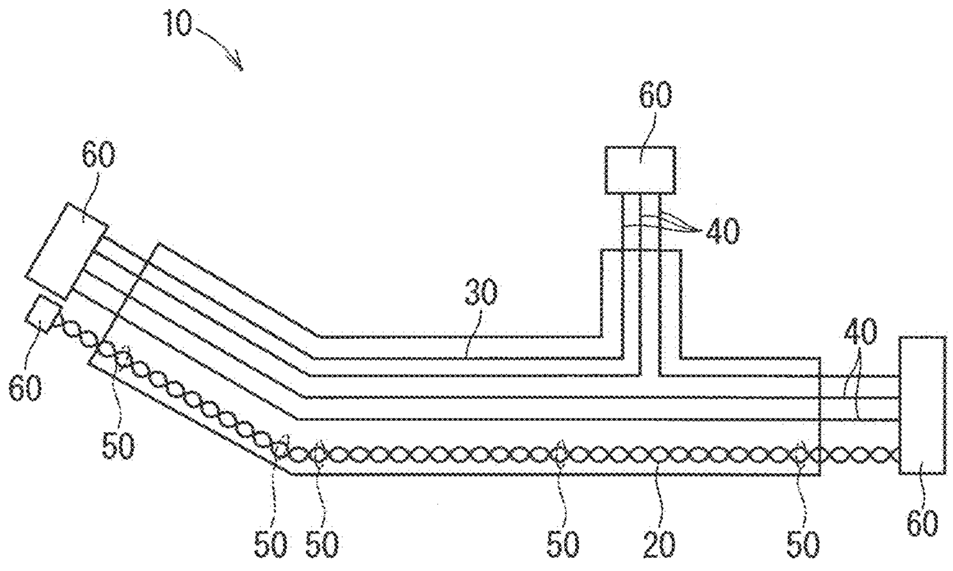
FIG. 1 is a plan view illustrating a wiring member according to an embodiment 1.

Embodiments of the present disclosure are listed and described firstly.

A wiring member according to the present disclosure is as follows.

(1) A wiring member includes: a twisted wire in which a first wire-like transmission member and a second wire-like transmission member are stranded; and a base member to which the twisted wire is fused and fixed, wherein when parts of the twisted wire in which the first wire-like transmission member and the second wire-like transmission member are arranged side by side on the base member are side-by side parts, and parts of the twisted wire in which the first wire-like transmission member and the second wire-like transmission member are vertically arranged are tandem parts, the side-by-side parts and the vertical parts alternately extend along an extension direction of the twisted wire, a section between two of the vertical parts continuously formed is a half cycle section of a strand in the twisted wire, each of the first wire-like transmission member and the second wire-like transmission member is fused to the base member in each the side-by-side parts to form a side-by-side fusion part, and a length of a first half cycle section including the side-by-side fusion part is larger than a length of a second half cycle section located adjacent to the first half cycle section. The length of the first half cycle section including the side-by-side fusion part is larger than the length of the second half cycle section located adjacent to the first half cycle section, the side-by-side fusion part can be easily elongated. Accordingly, the twisted wire can be fused and fixed to the base member more rigidly.

(2) In the wiring member according to (1), the first wire-like transmission member and the second wire-like transmission member may be away from each other in a parallel direction in the side-by-side fusion part. Accordingly, suppressed is an overlap between the first wire-like transmission member and the second wire-like transmission member in fusion, and each of the first wire-like transmission member and the second wire-like transmission member can be fused and fixed to the base member more rigidly.

(3) In the wiring member according to (1) or (2), the first wire-like transmission member and the second wire-like transmission member may extend straight in parallel to each other in the side-by-side fusion part. Accordingly, each of the first wire-like transmission member and the second wire-like transmission member can be rigidly fixed to the base member easily in the side-by-side fusion part, and the twisted wire can be fused and fixed to the base member more rigidly.

(4) In the wiring member according to any one of (1) to (3), the first wire-like transmission member and the second wire-like transmission member may not be fused to the base member while being disposed on the base member in the second half cycle section. Accordingly, a part of the plurality of side-by-side parts in the twisted wire is fused to the base member, thus the fusion process is simplified. Also in this case, the side-by-side fusion part can be elongated, thus the twisted wire can be fused and fixed to the base member more rigidly.

(5) In the wiring member according to any one of (1) to (4), it is applicable that a length dimension of a fusion part of the first wire-like transmission member in the side-by-side fusion part is larger than a width dimension of the first wire-like transmission member, and a length dimension of a fusion part of the second wire-like transmission member in the side-by-side fusion part is larger than a width dimension of the second wire-like transmission member. Accordingly, the twisted wire can be fused and fixed to the base member more rigidly.

Detailed Description of Embodiment of Present Disclosure

Specific examples of a wiring member of the present disclosure are described hereinafter with reference to the drawings. The present disclosure is not limited to these examples, but is indicated by claims, and it is intended that meanings equivalent to claims and all modifications within a scope of claims are included.

Embodiment 1

A wiring member according to an embodiment 1 is described hereinafter. In each diagram, a part of a configuration may be exaggerated or simplified in some cases for convenience of description. A dimension ratio of each part may be different between the diagrams in some cases. “Perpendicular” in the present specification includes not only a definitely perpendicular state but also a substantially perpendicular state. The substantially perpendicular state indicates a state where an angle formed by two directions is preferably equal to or larger than 85 degrees and smaller than 90 degrees, for example. “Parallel” in the present specification includes not only a definitely parallel state but also a substantially parallel state. The substantially parallel state indicates a state where an angle formed by two directions is equal to or smaller than 10 degrees, and is preferably equal to or smaller than 5 degrees, for example.

Figure 2:
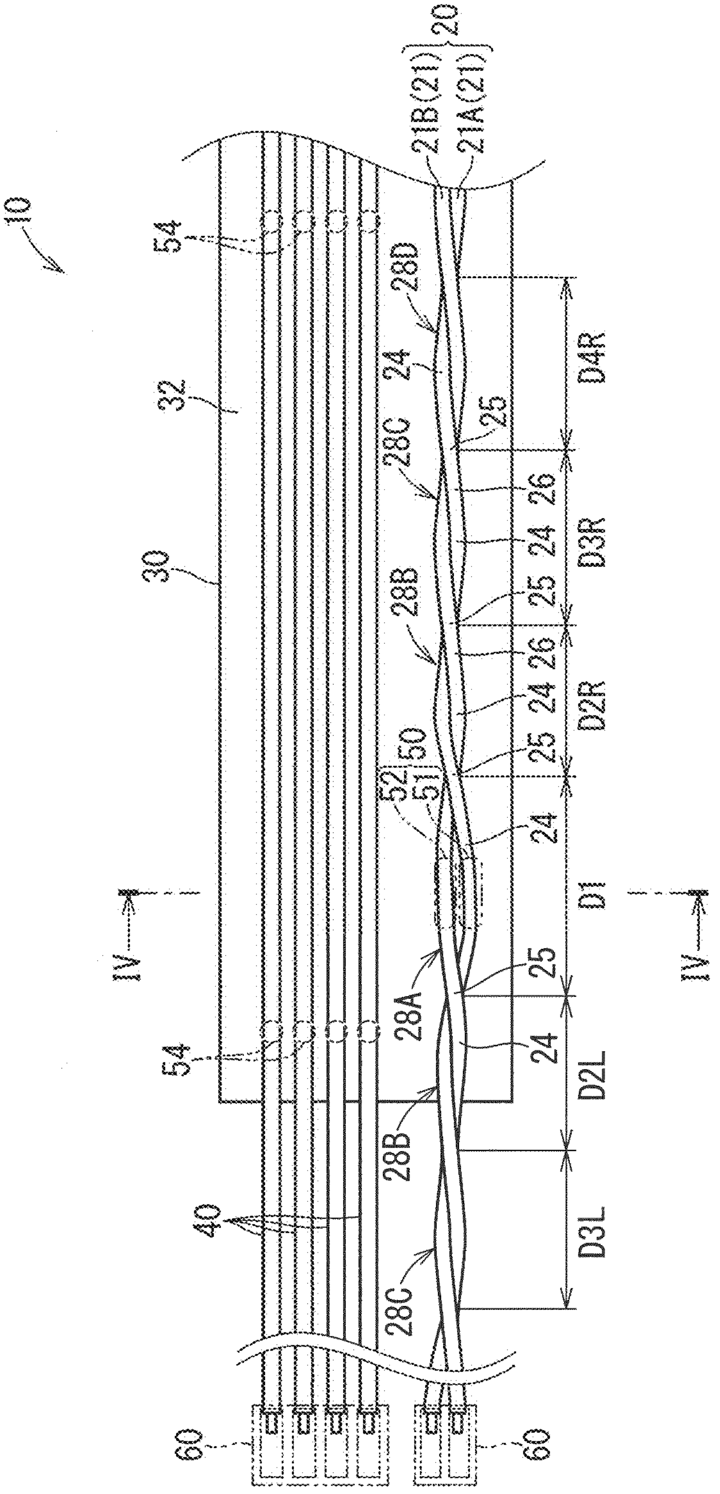
FIG. 2 is a partial enlarged view of FIG. 1.
Figure 3:
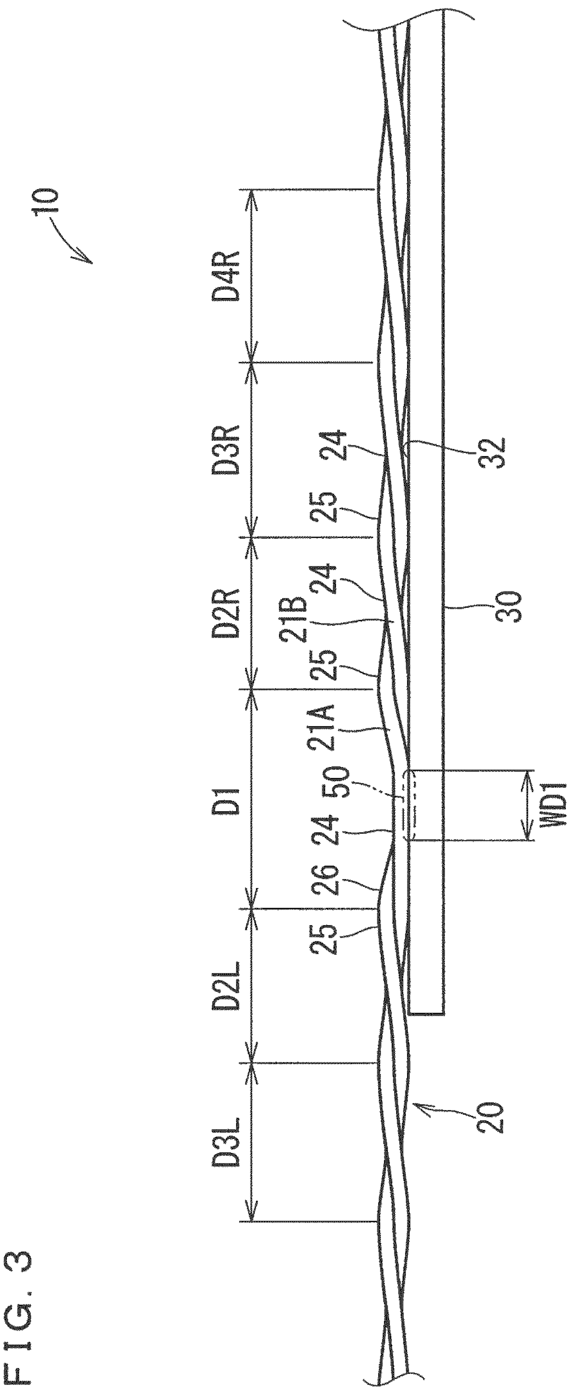
FIG. 3 is a side view illustrating the wiring member according to the embodiment 1.
Figure 4:
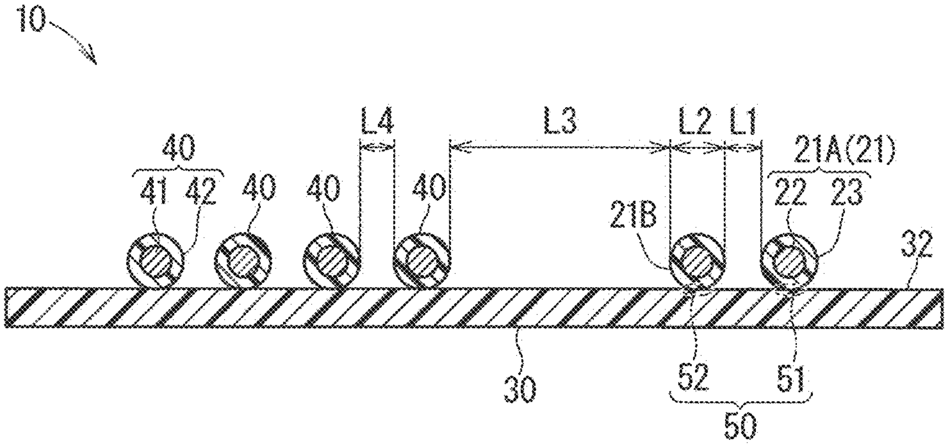
FIG. 4 is a cross-sectional view along a IV-IV line in FIG. 2.

FIG. 1 is a plan view illustrating a wiring member 10 according to the embodiment 1. FIG. 2 is a partial enlarged view of FIG. 1. FIG. 3 is a side view illustrating the wiring member 10 according to the embodiment 1. FIG. 3 illustrates the wiring member 10 in a range similar to FIG. 2. FIG. 4 is a cross-sectional view along a IV-IV line in FIG. 2.

The wiring member 10 includes a twisted wire 20 and a base member 30. The wiring member 10 further includes an additional wire-like transmission member 40. The twisted wire 20 and the additional wire-like transmission member 40 are fused and fixed to the base member 30.

The twisted wire 20 includes a first wire-like transmission member 21A and a second wire-like transmission member 21B. The first wire-like transmission member 21A and the second wire-like transmission member 21B are stranded. The first wire-like transmission member 21A and the second wire-like transmission member 21B are the same type of wire-like transmission members. When the first wire-like transmission member 21A and the second wire-like transmission member 21B need not be distinguished from each other, the first wire-like transmission member 21A and the second wire-like transmission member 21B are collectively referred to as the wire-like transmission member 21 in some cases.

The wire-like transmission member 21 may be a wire-like member transmitting electricity or light, for example. For example, the wire-like transmission member 21 may be a general wire having a core wire and a covering around the core wire, or may also be a shielded wire, an enamel wire, a nichrome wire, or an optical fiber. The wire-like transmission member transmitting the electricity may be various kinds of signal lines or various kinds of power lines. The wire-like transmission member transmitting the electricity may be used as an antenna or coil, for example, transmitting or receiving a signal or electrical power to or from a space.

The wire-like transmission member 21 includes a transmission wire body 22 and a covering layer 23 covering the transmission wire body. In the description herein, the wire-like transmission member 21 is a general wire 21 (simply referred to as the electrical wire 21 hereinafter). The electrical wire 21 includes a core wire 22 as the transmission wire body 22 and an insulating covering 23 as the covering layer 23 for covering the core wire 22. Each description on the electrical wire 21 is applicable to the wire-like transmission member 21 except for a configuration to which the description is not applicable.

The core wire 22 is made up of one or a plurality of strands. The strand is formed of a conductor made of copper, copper alloy, aluminum, or aluminum alloy, for example. When the core wire 22 is made up of the plurality of strands, the plurality of strands may be stranded. The insulating covering 23 is formed of a resin material such as polyvinyl chloride (PVC) or polyethylene (PE) extrusion-molded around the core wire 22. Herein, the electrical wire 21 is a so-called round wire having a round shape in cross section.

A least a part of the twisted wire 20 is disposed on the base member 30. Herein, a part of the twisted wire 20 including an intermediate part is disposed on the base member 30. An end portion of the twisted wire 20 extends from an end portion of the base member 30 to an outer side of the base member 30.

The base member 30 is a member in which the twisted wire 20 is fused and fixed on a main surface 32. The twisted wire 20 is fused and fixed on the main surface 32, thus the twisted wire 20 is held along a predetermined route on the main surface 32. That is to say, the base member 30 is also considered a member having the main surface 32 holding the twisted wire 20 along the predetermined route. It is sufficient that the base member 30 is a member having the main surface 32 for fusing and fixing the twisted wire 20 as described above, thus may be formed into a sheet-like shape or a stereoscopic shape.

In the description herein, the base member 30 is a member having a flat part, more specifically, a sheet member 30 which can be bended in some cases. Each description on the sheet member 30 is applicable to the base member 30 except for a configuration to which the description is not applicable.

A material constituting the sheet member 30 is not particularly limited, however, the sheet member 30 is preferably formed of a material containing a resin of polyvinyl chloride (PVC), polyethylene terephthalate (PET), or polypropylene (PP). The sheet member 30 may be a sheet material with an inner portion evenly filled or a non-woven sheet, for example. The sheet member 30 may contain a material such as metal. The sheet member 30 preferably has flexibility of being easily bended in a thickness direction. The sheet member 30 may be made up of a single layer or a plurality of stacked layers. When the sheet member 30 is made up of the plurality of stacked layers, it is considered that a resin layer and a resin layer are stacked, for example. It is also considered that a resin layer and a metal layer are stacked, for example.

In the present embodiment, an additional wire-like transmission member 40 is fixed on the main surface 32 in addiction to the twisted wire 20 described above. The additional wire-like transmission member 40 may be a wire-like member transmitting electricity or light, for example, as with the wire-like transmission member 21, or may also be a member similar to the twisted wire 20. In the description herein, the additional wire-like transmission member 40 is a general wire 40 (simply referred to as the electrical wire 40 hereinafter) including a core wire 41 and an insulating covering 42. Each description on the electrical wire 40 is applicable to the additional wire-like transmission member 40 except for a configuration to which the description is not applicable. The plurality of additional wire-like transmission members 40 may be fixed on the main surface 32, or may also be omitted.

The electrical wire 40 is also fused and fixed on the main surface 32. A part where the electrical wire 40 fused and fixed on the main surface 32 is a fusion part 54. Herein, the electrical wire 40 is fixed to the main surface 32 in parallel with the twisted wire 20. The electrical wire 40 and the twisted wire 20 may be branched halfway through and fixed along separate routes. The whole electrical wire 40 and the whole twisted wire 20 may be fixed along separate routes on the main surface 32.

Based on an assumption of the configuration that the twisted wire 20 and the electrical wire 40 are fixed on the main surface 32, the base member 30 can be considered a member keeping at least one twisted wire 20 and at least one electrical wire 40 (additional wire-like transmission member 40) in a flat state on the main surface 32. Assumed furthermore is a configuration that the base member 30 has a flat part and at least one twisted wire 20 and at least one electrical wire 40 (additional wire-like transmission member 40) are fixed on a main surface 32 of the flat part. In this case, the wiring member 10 can be considered the wiring member 10 including a flat part keeping the twisted wire 20 and the electrical wire 40 (additional wire-like transmission member 40) in a flat state. Furthermore, the base member 30 is assumed to be the sheet member 30 which can be bended. In this case, the wiring member 10 can be considered the flat wiring member 10 keeping the twisted wire 20 and the electrical wire 40 (additional wire-like transmission member 40) in a flat state, and is the wiring member 10 which can be deformed in accordance with a shape of a surface on which the wiring member 10 is to be disposed.

The twisted wire 20 extends along an extension direction while a positional relationship between a first electrical wire 21A and a second electrical wire 21B is changed. When a part of the twisted wire 20 disposed on the main surface 32 of the sheet member 30 is observed from a direction perpendicular to the main surface 32, a side-by-side part 24 and a vertical part 25 alternately appear along the extension direction of the twisted wire 20. The side-by-side part 24 is a part where the first electrical wire 21A and the second electrical wire 21B are disposed in a parallel state on the sheet member 30. The vertical part 25 is a part where the first electrical wire 21A and the second electrical wire 21B are vertically arranged to be stacked on the main surface 32 of the sheet member 30. A section between the side-by-side part 24 and the vertical part 25 can be considered a shift part 26 for changing the positional relationship of the electrical wire 21.

In the continuous two side-by-side parts 24, a position of the first electrical wire 21A and a position of the second electrical wire 21B are switched from side to side. In the similar manner, in the continuous two vertical parts 25, the position of the first electrical wire 21A and the position of the second electrical wire 21B are switched up and down. In a certain vertical part 25 and another certain vertical part 25 from the certain vertical part 25 via the side-by-side part 24, the vertical part 25, and the side-by-side part 24, the position of the first electrical wire 21A and the position of the second electrical wire 21B are the same as each other, and a section from the certain vertical part 25 to the another certain vertical part 25 constitutes one cycle of strand in the twisted wire 20. Herein, a section of the continuous three vertical parts 25 constitutes one cycle section of strand, and a section of the continuous two vertical parts 25 constitutes a half cycle section of strand in the twisted wire 20.

The first electrical wire 21A and the second electrical wire 21B are arranged side by side on the main surface 32 in the side-by-side part 24, thus each of the first electrical wire 21A and the second electrical wire 21B is located in a position where each of them may have contact with the main surface 32 of the sheet member 30. Each of the first electrical wire 21A and the second electrical wire 21B arranged side by side is fused and fixed to the sheet member 30 in the side-by-side part 24, thereby forming a side-by-side fusion part 50. The first electrical wire 21 and the second electrical wire 21B are arranged side by side in the side-by-side part 24, thus the first electrical wire 21A and the second electrical wire 21B can have stably contact with the main surface 32 of the sheet member 30. Thus, the first electrical wire 21A and the second electrical wire 21B are stably fused and fixed on the main surface 32 of the sheet member 30 easily.

In the side-by-side fusion part 50, a part where the first electrical wire 21A and the sheet member 30 are fused is referred to as a first fusion part 51, and a part where the second electrical wire 21B and the sheet member 30 are fused is referred to as a second fusion part 52 in some cases. The side-by-side fusion part 50 can also be considered to include the first fusion part 51 and the second fusion part 52. The first fusion part 51 and the second fusion part 52 normally have the same length. The first fusion part 51 and the second fusion part 52 may have a length slightly different from each other.

The plurality of side-by-side parts 24 are linearly provided side by side at intervals in the extension direction of the twisted wire 20. The side-by-side fusion part 50 may be formed in only one of the plurality of side-by-side parts 24, or the side-by-side fusion part 50 may also be provided to some of the plurality of side-by-side parts 24. In the latter case, the side-by-side fusion part 50 may be continuously provided to the plurality of side-by-side parts 24 without intervention of a position where the side-by-side fusion part 50 is not provided, or the side-by-side fusion part 50 may be provided to each of the plurality of side-by-side parts 24. Herein, the side-by-side fusion part 50 is provided to the side-by-side parts 24 in a plurality of positions which are not continuously formed from each other in the plurality of side-by-side parts as illustrated in FIG. 1.

The half cycle section including the side-by-side fusion part 50 is referred to as a first half cycle section 28A. The half cycle section adjacent to the first half cycle section 28A is referred to as a second half cycle section 28B, and the half cycle section is referred to as a third half cycle section 28C and a fourth half cycle section 28D with increasing distance from the first half cycle section 28A hereinafter. The second half cycle section 28B, the third half cycle section 28C, and the fourth half cycle section 28D are normally located on each of both sides of the first half cycle section 28A. When the first half cycle section 28A is located in the end portion of the sheet member 30 and the end portion of the twisted wire 20 is provided to a part close to the end portion of the sheet member 30, there is a case where the second half cycle section 28B, the third half cycle section 28C, and the fourth half cycle section 28D are not provided on a side of the end portion of the twisted wire 20.

Herein, in each of two second half cycle sections 28B on one side and the other side of the first half cycle section 28A, the first wire-like transmission member 21A and the second wire-like transmission member 21B are not fused to the base member 30 while being disposed thereon. Also in the third half cycle section 28C and the fourth half cycle section 28D on one side of the first half cycle section 28A, the first wire-like transmission member 21A and the second wire-like transmission member 21B are not fused to the base member 30 while being disposed thereon.

In FIG. 2 and FIG. 3, a dimension D1 is a length of the first half cycle section 28A. Each of dimensions D2L and D2R is a length of the second half cycle section 28B. Each of dimensions D3L and D3R is a length of the third half cycle section 28C. A dimension D4R is a length of the fourth half cycle section 28D. A sign L and a sign R of the length of the second half cycle section 28B indicate a side, that is one side or the other side of the first half cycle section 28A, on which the second half cycle section 28B is located. The same applies to the third half cycle section 28C and the fourth half cycle section 28D.

The length D1 of the first half cycle section 28A is longer than the lengths D2R and D2L of the second half cycle section 28B. Herein, the length D1 of the first half cycle section 28A is longer than the lengths D2R and D2L of two second half cycle sections 28B on one side and the other side of the first half cycle section 28A, respectively. It is sufficient that the length D1 of the first half cycle section 28A is longer than at least one of the lengths D2R and/or D2L of two second half cycle sections 28B on one side and the other side of the first half cycle section 28A.

Herein, the length D1 of the first half cycle section 28A is longer than the lengths D3R and D3L of the third half cycle section 28C. Herein, the length D1 of the first half cycle section 28A is longer than the lengths D3R and D3L of two third half cycle sections 28C on one side and the other side of the first half cycle section 28A, respectively. It is sufficient that the length D1 of the first half cycle section 28A is longer than at least one of the lengths D3R and/or D3L of two third half cycle sections 28C on one side and the other side of the first half cycle section 28A.

Herein, the length D1 of the first half cycle section 28A is longer than the length of the fourth half cycle section 28D. Herein, the length D1 of the first half cycle section 28A is longer than the length D4R of the fourth half cycle section 28D on one side of the first half cycle section 28A. The length of the first half cycle section 28A may be longer than the length of the fourth half cycle section 28D on the other side of the first half cycle section 28A.

Herein, the lengths D2R and D2L of the second half cycle section 28B are shorter than the lengths D3R and D3L of the third half cycle section 28C, respectively. The reason is that the lengths D2R and D2L of the second half cycle section 28B decrease by increase in the length D1 of the first half cycle section 28A. The lengths D2R and D2L of the second half cycle section 28B may be the same as the lengths D3R and D3L of the third half cycle section 28C, respectively. For example, even when the length D1 of the first half cycle section 28A is increased, decrease in the lengths D2R and D2L of the second half cycle section 28B can be suppressed by rewinding the twisted wire 20.

The length D1 of the first half cycle section 28A may be longer than an average of the lengths of all of the half cycle sections in the twisted wire 20. The average of the lengths of all of the half cycle sections in the twisted wire 20 has a value close to a half (referred to as the half pitch hereinafter) a strand pitch (length of one cycle section) set in manufacturing the twisted wire 20. The strand pitch is not particularly limited, but may be 25 mm to 40 mm, for example.

The length D1 of the first half cycle section 28A may be three times or less as large as the lengths D2R and D2L of the second half cycle section 28B, or may also be twice or less or one and a half times or less. The length D1 of the first half cycle section 28A may be three times or less as large as the half pitch, or may also be twice or less or one and a half times or less. For example, the length D1 of the first half cycle section 28A may be 1.2 times as large as the half pitch. The length D1 of the first half cycle section 28A is not too long, thus noise resistance required for the twisted wire 20 can be ensured.

As illustrated in FIG. 2, herein, the first wire-like transmission member 21A and the second wire-like transmission member 21B extend straight in parallel to each other in the side-by-side fusion part 50. The side-by-side part 24 in the first half cycle section 28A is formed more straight than the side-by-side part 24 in the second half cycle section 28B. In the side-by-side fusion part 50, the length of the first wire-like transmission member 21A having contact with the base member 30 and the length of the second wire-like transmission member 21B having contact with the base member 30 increase.

A sign L and a sign R of the length of the second half cycle section 28B indicate a side, that is one side or the other side of the first half cycle section 28A, on which the second half cycle section 28B is located. The same applies to the third half cycle section 28C and the fourth half cycle section 28D.

As illustrated in FIG. 4, herein, the first wire-like transmission member 21A and the second wire-like transmission member 21B are away from each other in a parallel direction in the side-by-side fusion part 50. In FIG. 4, the dimension L1 is an interval between the first wire-like transmission member 21A and the second wire-like transmission member 21B. In FIG. 4, the dimension L2 is a width dimension (diameter herein) of the electrical wire 21. The dimension L2 is an interval between the twisted wire 20 and the electrical wire 40. The dimension L4 is an interval between the electrical wires 40. For example, the dimension L1 may be equal to or smaller than the dimension L2. The dimension L1 may be equal to or smaller than the dimension L3. The dimension L1 may be equal to or smaller than the dimension L4.

The first electrical wire 21A and the second electrical wire 21B may or may not have contact with each other in the side-by-side part 24 where the side-by-side fusion part 50 is not provided.

In FIG. 3, a dimension WD1 is a length dimension of a fusion part of the electrical wire 21 in the side-by-side fusion part 50. The length dimension WD1 of the fusion parts 51 and 52 of the electrical wire 21 in the side-by-side fusion part 50 is larger than the width dimension L2 of the electrical wire 21. The length dimension of the fusion part of the first electrical wire 21A in the side-by-side fusion part 50 is the same as the length dimension of the fusion part of the second electrical wire 21B. The length dimension of the fusion parts 51 and 52 of the electrical wire 21 may be larger than the length dimension of the fusion part 54 of the electrical wire 40.

Adoptable are various types of fusion means such as ultrasonic fusion, heating pressurizing fusion, hot air fusion, and high-frequency fusion in forming a state of fusion fixation in the side-by-side fusion part 50. When the state of the fusion fixation is formed by these means, the electrical wire 21 and the sheet member 30 are in the state of the fusion fixation by these means. Specifically, when the state of the fusion fixation is formed by ultrasonic fusion, the electrical wire 21 and the sheet member 30 are in the state of the fusion fixation by ultrasonic fusion. A part where the state of fusion fixation is formed (a fixation part where the electrical wire 21 and the sheet member 30 are fixed) may be referred to as a fusion part, and in such a part, a fixation part by ultrasonic fusion may be referred to as an ultrasonic fusion part, and a fixation part by heating pressurizing fusion may be referred to as a heating pressurizing fusion part, for example.

In the fusion fixation, only resin included in the covering of the electrical wire 21 may be melted, or only resin included in the sheet member 30 may be melted. In these cases, the resin which has been melted is stuck on an outer surface of the resin on the other side, and a relatively clear interface may be formed in some cases. In the fusion fixation, both resin included in the covering of the electrical wire 21 and resin included in the sheet member 30 may be melted. In this case, there may be a case where the resin in both the components are mixed and a clear interface is not formed. Particularly, when the covering of the electrical wire 21 and the sheet member 30 include compatible resin such as the same resin material, for example, there may be a case where the resin in both the components are mixed and a clear interface is not be formed.

In the description herein, the electrical wire 21 and the sheet member 30 are ultrasonic-fused. Each description on the electrical wire 21 and the sheet member 30 is applicable to various types of fusion fixation described above as long as each member and material has a configuration to which the above fixation is applicable.

A configuration similar to that of fixing the twisted wire 20 to the sheet member 30 described above can also be applied to a configuration of fixing the electrical wire 40, and a configuration of fixing by ultrasonic welding can be applied, for example.

A connection member 60 such as an electrical connector and an optical connector may be provided on an end portion of the twisted wire 20 and an end portion of the electrical wire 40 as illustrated in FIG. 2. The wiring member 10 is connected to an electrical component and an optical component via the connection member 60, thus the wiring member 10 serves as the wiring member 10 connecting the plurality of electrical components and optical components.

<Manufacturing Method>

Figure 5:
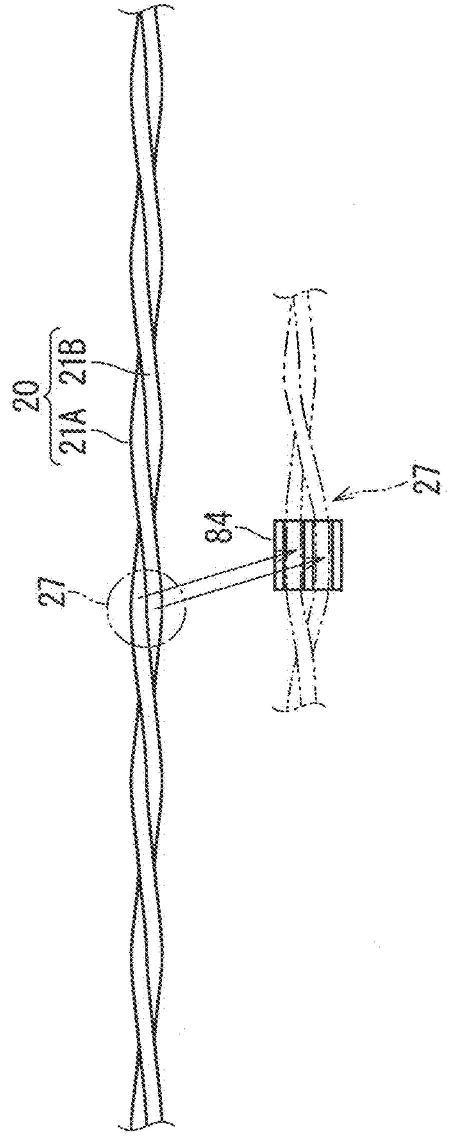
FIG. 5 is an explanation diagram illustrating a preparation process for fusing a twisted wire.
Figure 6:
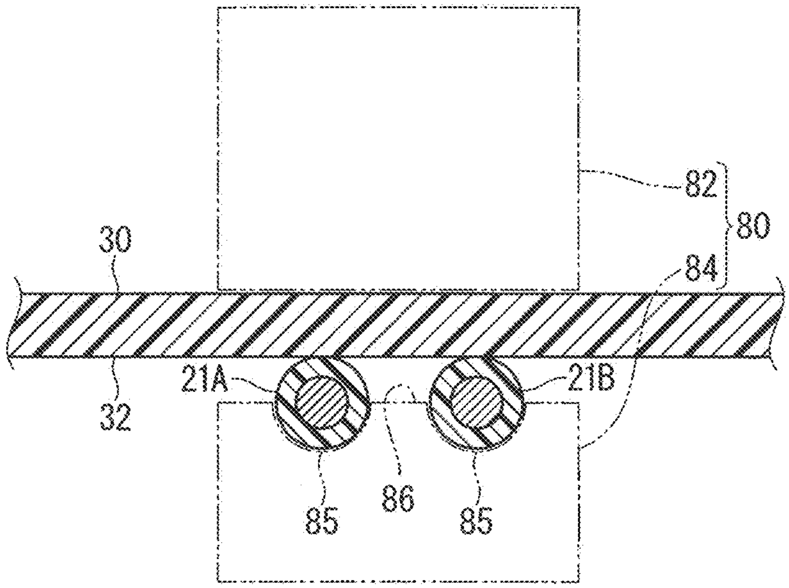
FIG. 6 is an explanation diagram illustrating a fusion process of fusing the twisted wire.

FIG. 5 is an explanation diagram illustrating a preparation process for fusing the twisted wire 20. FIG. 6 is an explanation diagram illustrating a fusion process of fusing the twisted wire 20.

Described herein is an example that the twisted wire 20 is ultrasonic-fused to the base member 30 by an ultrasonic fusion machine 80. The ultrasonic fusion machine 80 includes a horn 82 and an anvil 84. The twisted wire 20 is held by the anvil 84.

In FIG. 5, the twisted wire 20 illustrated by a solid line is the twisted wire 20 before fusion. The twisted wire 20 before fusion is continuously formed with a uniform pitch. In FIG. 5, a region illustrated by a circle of a dash-double-dot line indicates a to-be fused part 27 in the twisted wire 20. The to-be fused part 27 is held by the anvil 84. FIG. 5 illustrates a state where the twisted wire 20 shown by a dash-double-dot line is held by the anvil 84.

Two grooves 85 are formed in the anvil 84. Two grooves 85 are separated by a partition 86. The first electrical wire 21A and the second electrical wire 21B are held separately in each of two grooves 85. At this time, a length dimension of the groove 85 is larger than the length dimension of the side-by-side part 24 in the to-be fused part 27. Thus, the length dimension of the side-by-side part 24 in the to-be-fused part 27 gets larger in the twisted wire 20, and the twisted wire 20 is held by the anvil 84. At this time, a part of the twisted wire 20 serving as the to-be fused part 27 may be rewound. Accordingly, decrease of the half cycle section adjacent to the to-be fused part 27 is suppressed.

When the first electrical wire 21A and the second electrical wire 21B are held by the anvil 84, the sheet member 30 is disposed as illustrated in FIG. 6. The sheet member 30 is disposed to cover the first electrical wire 21A and the second electrical wire 21B. Then, the horn 82 is applied to an outer side of the sheet member 30 to provide a contact part between the sheet member 30 and the electrical wire 21 with ultrasonic vibration energy via the horn 82. Accordingly, the contact part between the sheet member 30 and the electrical wire 21 is fused.

The first electrical wire 21A and the second electrical wire 21B are fused to the sheet member 30 while being held by the anvil 84, thus a part of the first electrical wire 21A and the second electrical wire 21B having a length corresponding to a length held by the anvil 84 can be fused to the sheet member 30. Accordingly, the length of the first half cycle section 28A including the side-by-side fusion part 50 can be larger than that of the second half cycle section 28B. The first electrical wire 21A and the second electrical wire 21B are fused to the sheet while being away from each other in the parallel direction. The first electrical wire 21A and the second electrical wire 21B are fused to the sheet in a straight form in parallel to each other.

When the plurality of side-by-side fusion parts 50 are provided, it is applicable that ultrasonic welding is performed on each of the plurality of side-by-side parts 24, and the side-by-side fusion part 50 are formed one by one. It is also applicable that the horn 82 or the anvil 84 having a plurality of pressure parts protruding at intervals of integral multiple of a pitch of the side-by-side part 24 is used, and ultrasonic welding is collectively performed on the plurality of side-by-side parts 24 to simultaneously form the plurality of side-by-side fusion parts 50. It is also applicable that at least one of the horn 82 and/or the anvil 84 is moved along the twisted wire 20 and the pressure is applied and the ultrasonic vibration energy are supplied from the horn 82 and the anvil 84 in the side-by-side part 24 to be processed to form the plurality of side-by-side fusion parts 50 in series.

Effect Etc.

According to the wiring member 10 having such a configuration, the length D1 of the first half cycle section 28A including the side-by-side fusion part 50 is larger than the lengths D2R and D2L of the second half cycle section 28B adjacent to the first half cycle section 28A, thus the side-by-side fusion part 50 can be easily elongated. Accordingly, the twisted wire 20 can be fused and fixed to the base member 30 more rigidly.

The first wire-like transmission member 21A and the second wire-like transmission member 21B are away from each other in a parallel direction in the side-by-side fusion part 50. Accordingly, suppressed is an overlap between the first wire-like transmission member 21A and the second wire-like transmission member 21B in fusion, and each of the first wire-like transmission member 21A and the second wire-like transmission member 21B can be fused and fixed to the base member 30 more rigidly.

The first wire-like transmission member 21A and the second wire-like transmission member 21B extend straight in parallel to each other in the side-by-side fusion part 50. Accordingly, each of the first wire-like transmission member 21A and the second wire-like transmission member 21B can be rigidly fused to the base member 30 easily in the side-by-side fusion part 50, and the twisted wire 20 can be fused and fixed to the base member 30 more rigidly.

In the second half cycle section 28B, the first wire-like transmission member 21A and the second wire-like transmission member 21B are not fused to the base member 30 while being disposed thereon. Accordingly, a part of the plurality of side-by-side parts 24 in the twisted wire 20 is fused to the base member 30, thus the fusion process is simplified. Also in this case, the side-by-side fusion part 50 can be elongated, thus the twisted wire 20 can be fused and fixed to the base member 30 more rigidly.

The length dimension of the fusion part of the first wire-like transmission member 21A in the side-by-side fusion part 50 is larger than the width dimension of the first wire-like transmission member 21A. The length dimension of the fusion part of the second wire-like transmission member 21B in the side-by-side fusion part 50 is larger than the width dimension of the second wire-like transmission member 21B. Accordingly, the twisted wire 20 can be fused and fixed to the base member 30 more rigidly.

Appendix

In the description above, the first wire-like transmission member 21A and the second wire-like transmission member 21B are away from each other in the parallel direction in the side-by-side fusion part 50, however, this configuration is not necessary.

The first wire-like transmission member 21A and the second wire-like transmission member 21B may have contact with each other in the parallel direction in the side-by-side fusion part 50.

In the description above, the first wire-like transmission member 21A and the second wire-like transmission member 21B extend straight in parallel to each other in the side-by-side fusion part 50, however, this configuration is not necessary. For example, the first wire-like transmission member 21A and the second wire-like transmission member 21B may extend in directions different from each other in the side-by-side fusion part 50.

In the description above, in the second half cycle section 28B, the first wire-like transmission member 21A and the second wire-like transmission member 21B are not fuse to the base member 30 while being disposed thereon, however, this configuration is not limited thereto. Also in the second half cycle section 28B, the first wire-like transmission member 21A and the second wire-like transmission member 21B may be fused to the base member 30. Also in this case, the first half cycle section 28A having a long half cycle section is provided, thus a part including the long side-by-side fusion part 50 can be provided.

In the above description, the length dimension of the fusion part of the first wire-like transmission member 21A in the side-by-side fusion part 50 is larger than the width dimension of the first wire-like transmission member 21A, and the length dimension of the fusion part of the second wire-like transmission member 21B in the side-by-side fusion part 50 is larger than the width dimension of the second wire-like transmission member 21B, however, this configuration is not necessary. The length dimension of the fusion part of the first wire-like transmission member 21A in the side-by-side fusion part 50 may be equal to or smaller than the width dimension of the first wire-like transmission member 21A. For example, the length dimension of the fusion part of the second wire-like transmission member 21B in the side-by-side fusion part 50 may be equal to or smaller than the width dimension of the second wire-like transmission member 21B.

The configurations described in the embodiments and modification examples thereof can be appropriately combined as long as they are not contradictory.

EXPLANATION OF REFERENCE SIGNS

10 wiring member
20 twisted wire
21 electrical wire (wire-like transmission member)
21A first electrical wire (first wire-like transmission member)
21B second electrical wire (second wire-like transmission member)
22 core wire (transmission wire body)
23 insulating covering (covering layer)
24 side-by-side part
25 vertical part
26 shift part
27 to-be fused part
28A first half cycle section
28B second half cycle section
28C third half cycle section
28D fourth half cycle section
30 sheet member (base member)
32 main surface
40 electrical wire (additional wire-like transmission member)
41 core wire
42 insulating covering
50 side-by-side fusion part
51 first fusion part
52 second fusion part
54 fusion part
60 connection member
80 ultrasonic welding machine
82 horn
84 anvil
85 groove
86 partition

The invention claimed is:

1. A wiring member, comprising:

a twisted wire in which a first wire-like transmission member and a second wire-like transmission member are stranded; and a base member to which the twisted wire is fused and fixed, wherein the twisted wire includes side-by-side parts in which the first wire-like transmission member and the second wire-like transmission member are arranged side by side on the base member, and vertical parts in which the first wire-like transmission member and the second wire-like transmission member are vertically arranged, the side-by-side parts and the vertical parts alternately extend along an extension direction of the twisted wire, a section between two adjacent vertical parts is a half cycle section of a strand in the twisted wire, the first wire-like transmission member and the second wire-like transmission member are not fused to the base member in all of the vertical parts, at least one of the side-by-side parts includes a side-by-side fusion part in which each of the first wire-like transmission member and the second wire-like transmission member is fused to the base member, and the half cycle section comprises a first half cycle section in which the side-by-side fusion part is included and a second half cycle section which is located adjacent to the first half cycle section in the extension direction of the twisted wire, a length of the first half cycle section is larger than a length of the second half cycle section.

2. The wiring member according to claim 1, wherein the first wire-like transmission member and the second wire-like transmission member are away from each other in a parallel direction in the side-by-side fusion part.

3. The wiring member according to claim 1, wherein the first wire-like transmission member and the second wire-like transmission member extend straight in parallel to each other in the side-by-side fusion part.

4. The wiring member according to claim 1, wherein the first wire-like transmission member and the second wire-like transmission member are not fused to the base member while being disposed on the base member in the second half cycle section.

5. The wiring member according to claim 1, wherein a length dimension of a fusion part of the first wire-like transmission member in the side-by-side fusion part is larger than a width dimension of the first wire-like transmission member, and a length dimension of a fusion part of the second wire-like transmission member in the side-by-side fusion part is larger than a width dimension of the second wire-like transmission member.

6. The wiring member according to claim 1, wherein the half cycle section further includes a third half cycle section, in which the first and second wire-like transmission members are not fused to the base member, the second half cycle section is provided between the first half cycle section and the third half cycle section, and a length of the third half cycle section is smaller than the length of the first half cycle section, and is larger than the length of the second half cycle section.

* * * * *